(12) United States Patent
Jung et al.

(10) Patent No.: US 8,781,013 B2
(45) Date of Patent: Jul. 15, 2014

(54) APPARATUS AND METHOD FOR POWER CONTROL IN MOBILE COMMUNICATION SYSTEM

(75) Inventors: Young-Seok Jung, Gyeonggi-do (KR); Bong-Gee Song, Gyeonggi-do (KR); Kwang-Man Ok, Gyeonggi-do (KR); Chae-Man Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1407 days.

(21) Appl. No.: 12/490,036

(22) Filed: Jun. 23, 2009

(65) Prior Publication Data

US 2009/0316821 A1    Dec. 24, 2009

(30) Foreign Application Priority Data

Jun. 23, 2008   (KR) .................. 10-2008-0058871

(51) Int. Cl.
*H04B 7/02*       (2006.01)
(52) U.S. Cl.
USPC .......... 375/267; 375/341; 375/262; 375/347; 375/349; 375/260; 375/316; 455/522; 455/101; 455/500; 455/132

(58) Field of Classification Search
USPC ......... 375/341, 262, 267, 347, 349, 260, 316; 455/522, 101, 500, 132
See application file for complete search history.

(56) References Cited

U.S. PATENT DOCUMENTS

| 7,852,744 | B2 * | 12/2010 | Palanki | .................. 370/204 |
| 8,165,186 | B2 * | 4/2012 | Luo et al. | .................. 375/148 |
| 2007/0104253 | A1 | 5/2007 | Luo et al. | |
| 2008/0123547 | A1 | 5/2008 | Palanki | |
| 2009/0092208 | A1 * | 4/2009 | Montekyo et al. | ............ 375/346 |

* cited by examiner

*Primary Examiner* — Daniel Washburn
*Assistant Examiner* — Rahel Guarino
(74) *Attorney, Agent, or Firm* — The Farrell Law Firm, P.C.

(57) ABSTRACT

An apparatus and method for power control are provided. In a receiver in a mobile communication system, a Receive (Rx) signal received through a plurality of antennas is estimated. A power ratio between a traffic channel of the Rx signal and a pilot channel of the Rx signal is determined. A Log Likelihood Ratio (LLR) value is determined using the power ratio between the traffic channel and the pilot channel, a symbol of the traffic channel, and an Rx signal estimation value to which precoding is applied.

12 Claims, 4 Drawing Sheets

APPARATUS AND METHOD FOR POWER CONTROL IN MOBILE COMMUNICATION SYSTEM

PRIORITY

This application claims priority under 35 U.S.C. §119(a) to a Korean patent application filed in the Korean Intellectual Property Office on Jun. 23, 2008 and assigned Serial No. 10-2008-0058871, the entire disclosure of which is incorporated herein by reference.

BACKGROUND OF THE INVENTION

1. Field of the Invention

The present invention relates generally to power control in a mobile communication system, and more particularly, to an apparatus and method for signaling of a transmitting end and estimation of a receiving end, whereby the transmitting end of a mobile communication system controls transmit power between physical layers so that the receiving end may effectively estimate the transmit power between the physical layers.

2. Description of the Related Art

Mobile communication systems are evolving from voice-oriented services to high speed, high volume services such as data services, multimedia services, etc.

Recent mobile communication systems employ standards using an Adaptive Modulation and Coding (AMC) scheme in which a modulation order and a coding rate are regulated according to a wireless channel condition in order to achieve high-speed data transmission within a limited frequency band.

The AMC scheme has a plurality of combinations of modulation orders and coding rates. In general, the combinations of modulation orders and coding rates are referred to as a Modulation and Coding Scheme (MCS).

The AMC scheme may improve spectral efficiency by determining and transmitting an MCS level according to a channel condition between a User Equipment (UE) and a Base Station (BS) currently connected to the UE.

When using the AMC scheme, if the channel condition between the UE and the BS is excellent, an MCS for a high-order modulation scheme (e.g., 8-Phase-Shift Keying (PSK), 16-Quadrature Amplitude Modulation (QAM), 64-QAM, etc.) is selected. Otherwise, if the channel condition between the UE and the BS is poor, an MCS for a low-order modulation scheme (e.g., Binary Phase-Shift Keying (BPSK) or Quadrature Phase-Shift Keying (QPSK)) is selected.

BPSK, which is one of the low-order modulation schemes, may generate a Log Likelihood Ratio (LLR) to be delivered to a channel decoder for each symbol on a constellation, in the presence of phase information of a channel, without having to use additional information. For general use of a Max-Log-MAP scheme, QPSK also may generate the LLR, in the presence of the phase information of the channel, without having to use additional information.

However, even when using the Max-Log-MAP scheme, 8-PSK, 16-QAM, and 64-QAM schemes require information on a phase and size of the channel to generate the LLR.

A mobile communication system, which requires such channel information, estimates a channel by receiving a signal with a predetermined format to estimate the channel information. The signal transmitted for channel estimation is referred to as a pilot signal.

In general, the pilot signal used for channel estimation is a common pilot signal that may be received by all user terminals for the effective use of radio frequency resources. A dedicated pilot signal may be transmitted for a specific user terminal.

In order for a channel estimation result to be used for demodulation and LLR generation, there is a need to know a power ratio (or a symbol energy ratio) between a pilot signal and other signals of physical channels for which demodulation and LLR generation are necessary. This is requirement is due to the fact that power for guaranteeing quality of the physical channels is generally different from power for guaranteeing quality of the pilot signal.

A high volume mobile communication system is implemented by using a high-order modulation scheme. Since a power ratio between a pilot signal used for channel estimation and a traffic signal is different, information on the power ratio between the pilot signal and the traffic signal is required for demodulation and LLR generation.

In delivering the power ratio from a transmitting end to a receiving end using signaling, a signaling overhead increases. Further, if the receiving end estimates the power ratio, a traffic error rate may increase due to erroneous estimation.

In particular, it is difficult to estimate the power ratio when using a Spatial Multiplexing Multiple Input Multiple Output (SM MIMO) system, which has recently been used to increase spectral efficiency.

SUMMARY OF THE INVENTION

The present invention has been made to address at least the above problems and/or disadvantages and to provide at least the advantages described below Accordingly, an aspect of the present invention provides an apparatus and method for power control in a mobile communication system.

Another aspect of the present invention provides an apparatus and method in which a transmitting end of a mobile communication system provides collective power control to not only a pilot channel and a traffic channel but also a control channel so as to reduce an overhead generated by signaling of a power ratio, which is measured between the pilot channel and the traffic channel and is required by the receiving end for demodulation and LLR generation of the traffic channel, and so as to effectively estimate the power ratio.

According to one aspect of the present invention, a receiving method of a receiver in a mobile communication system is provided. A Receive (Rx) signal received through a plurality of antennas is estimated. A power ratio between a traffic channel of the Rx signal and a pilot channel of the Rx signal is determined. An LLR value is determined using the power ratio between the traffic channel of the Rx signal and the pilot channel of the Rx signal, a symbol of the traffic channel of the Rx signal, and an Rx signal estimation value to which precoding is applied.

According to another aspect of the present invention, a receiver apparatus in a mobile communication system is provided. The apparatus includes a channel estimator for estimating an Rx signal received through a plurality of antennas, and a Traffic-to-Pilot Power Ratio (TPPR) operator for determining a power ratio between a traffic channel of the Rx signal and a pilot channel of the Rx signal. The apparatus also includes a Multiple Input Multiple Output (MIMO) demodulator for determining an LLR value using the power ratio between the traffic channel of the Rx signal and the pilot channel of the Rx signal, a symbol of the traffic channel of the Rx signal, and an Rx signal estimation value to which precoding is applied.

According to an additional aspect of the present invention, a transmitting method of a transmitter in a mobile communication system is provided. Control information is received. Refinement power control information is received. A control sequence is generated by integrating the control information and the refinement power control information. Channel coding and modulation is performed on the control sequence and a result of the channel coding and modulation is transmitted to a receiver through a plurality of antennas.

According to a further aspect of the present invention, a transmitter apparatus in a mobile communication system is provided. The apparatus includes a higher layer for providing control information, a traffic/control power controller for providing refinement power control information, and a control sequence generator for generating a control sequence by integrating the control information and the refinement power control information. The apparatus also includes a MIMO transmitter for performing channel coding and modulation on the control sequence and for transmitting a result of the channel coding and modulation to a receiver through a plurality of antennas.

According to another aspect of the present invention, a transmitting method of a transmitter in a mobile communication system is provided. Control information is provided. A control sequence is generated using the control information. Channel coding and modulation are performed on the control sequence and a result of the channel coding and modulation is transmitted to a receiver through a plurality of antennas.

According to a further aspect of the present invention, a transmitter apparatus in a mobile communication system is provided. The apparatus includes a higher layer for providing control information, and a control sequence generator for generating a control sequence using the control information. The apparatus also includes a MIMO transmitter for performing channel coding and modulation on the control sequence and for transmitting a result of the channel coding and modulation to a receiver through a plurality of antennas.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF PREFERRED EMBODIMENTS

Figure 1:
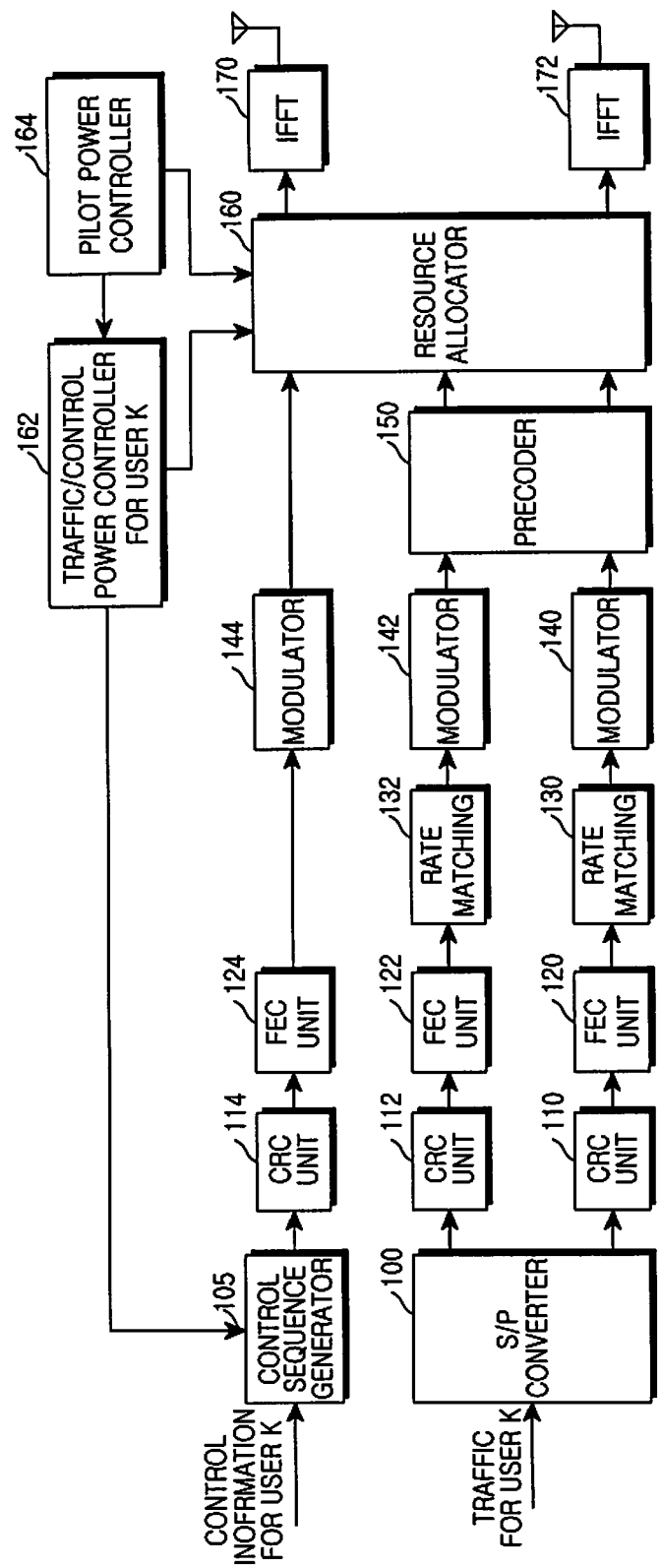
FIG. 1 is a block diagram illustrating a structure of a transmitter when power of a traffic channel and power of a control channel are collectively controlled in a Multiple Input Multiple Output (MIMO) system using Orthogonal Frequency Division Multiple Access (OFDMA)-based multiple Transmit (Tx) antennas, according to an embodiment of the present invention.

Preferred embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Hereinafter, an apparatus and method for power control in a mobile communication system are described.

Although an Orthogonal Frequency Division Multiple Access (OFDMA) system is described as an example, the present invention may also apply to all communication systems using a power ratio between a pilot channel and a traffic channel.

FIG. 1 is a block diagram illustrating a structure of a transmitter when power of a traffic channel and power of a control channel are collectively controlled in a Multiple Input Multiple Output (MIMO) system using OFDMA-based multiple Transmit (Tx) antennas, according to an embodiment of the present invention.

Referring to FIG. 1, regarding the traffic channel (for a user k), a Serial-to-Parallel (S/P) converter 100 converts a traffic bit provided from a higher layer into a parallel traffic bit. Cyclic Redundancy Check (CRC) units 110 and 112 attach a CRC bit to the parallel traffic bit to detect an error generated in the transmission process. Forward Error Correction (FEC) encoders 120 and 122 encode the CRC-attached traffic bit using an error correction code to correct an error caused by noise. In general, for the FEC process, a mobile communication system uses convolutional codes, turbo codes, Low-Density Parity-Check (LDPC) codes, or the like.

Rate matching units 130 and 132 match the encoded traffic bit to the number of modulation symbols allocated to each user k. The number of channel-encoded traffic bits is matched to the number of modulation symbols allocated to each user.

Modulators 140 and 142 generate Tx symbols by mapping the traffic bits matched by the rate matching units 130 and 132 onto a signal constellation.

A precoder 150 performs precoding on the Tx symbols mapped with the traffic bits using feedback information and delivers the precoded symbols to a resource allocator 160.

Meanwhile, regarding a control channel of FIG. 1, a control sequence generator 105 converts control information (for the user k) input from the higher layer into a sequence format according to a predetermined rule.

When power of the traffic channel and power of a control channel are collectively controlled, necessary refinement power control information may also be incorporated into a control sequence. The refinement power control information is generated and provided by a traffic/control power controller (for the user k) 162. The refinement power control information may not be provided to a receiver according to a condition of a receiver, a communication environment, etc. The refinement power control information indicates refinement power.

A CRC unit 114 attaches a CRC bit to detect an error generated in the transmission process. An FEC encoder 124 encodes a CRC-attached traffic bit using an error correction code to correct an error caused by noise. A modulator 144 maps the CRC-attached traffic bit onto a signal constellation. Then, the modulator 144 generates a Tx symbol to be transmitted through the control channel and delivers the generated symbol to the resource allocator 160.

The resource allocator 160 re-sorts traffic symbols, control symbols, and pilot symbols, and correctively regulates the power of the traffic channel and the power of the control channel. Information for controlling control power is based on feedback information of a Mobile Station (MS).

The traffic/control power controller (for the user k) 162 provides the control information to the resource allocator 160. A pilot power controller 164 determines power of a pilot symbol to be transmitted and then provides the determined power to the traffic/control power controller (for the user k) 162 and the resource allocator 160.

Frequency-domain symbols whose power ratio is regulated are converted into time-domain symbols by Inverse Fast Fourier Transform (IFFT) units 170 and 172 and are then transmitted through antennas.

Figure 2:
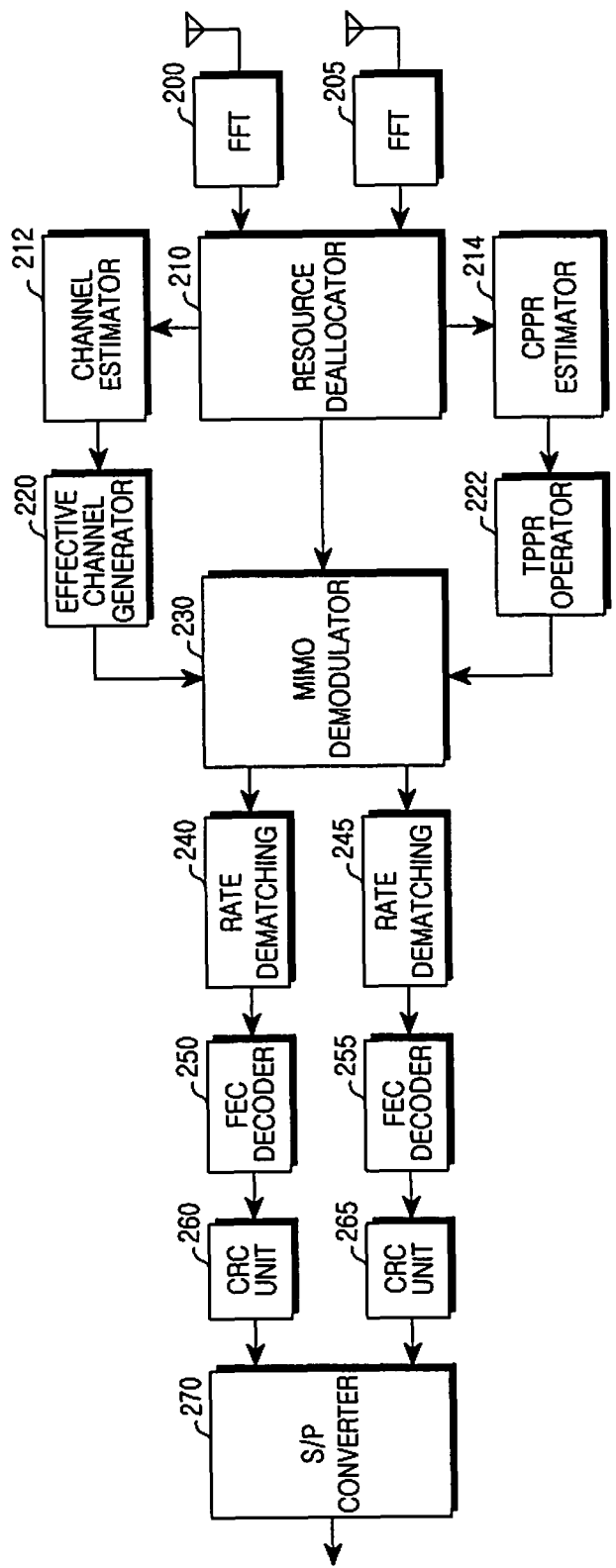
FIG. 2 is a block diagram illustrating a structure of a receiver when power of a traffic channel and power a control channel are collectively controlled in a MIMO system using OFDMA-based multiple Receive (Rx) antennas, according to an embodiment of the present invention.

FIG. 2 is a block diagram illustrating a structure of a receiver when power of a traffic channel and power a control channel are collectively controlled in a MIMO system using OFDMA-based multiple Receive (Rx) antennas, according to an embodiment of the present invention.

Referring to FIG. 2, regarding the traffic channel, Fast Fourier Transform (FFT) units 200 and 205 convert time-domain signals received through respective Rx antennas into frequency-domain symbols by performing an FFT operation, and deliver the converted signals to a resource deallocator 210.

The resource deallocator 210 divides the frequency-domain signals into a symbol of the control channel, a symbol of the traffic channel, and a symbol of a pilot channel. The symbol of the pilot channel is delivered to a channel estimator 212 and a Control-to-Pilot Power Ratio (CPPR) estimator 214. The symbol of the control channel is delivered to the CPPR estimator 214. Further, the resource deallocator 210 delivers the traffic symbol to a MIMO demodulator 230.

The channel estimator 212 performs channel estimation using the symbol of the pilot channel, specifically, using the pilot channel. An effective channel generator 220 applies an effect of precoding to the channel-estimated symbol.

The CPPR estimator 214 receives both of the symbol of the pilot channel and the symbol of the control channel, determines power of the symbols of the two channels and a power ratio thereof, and delivers the obtained results to a Traffic-to-Pilot Power Ratio (TPPR) operator 222. The CPPR estimator 214 may obtain refinement power control information of a transmitter, i.e., refinement power, from the symbol of the control channel, and may use the obtained information to determine the power ratio between the control channel and the pilot channel. Then, the CPPR estimator 214 delivers the refinement power to the TPPR operator 222. According to an embodiment of the present invention, the TPPR operator 222 may use only a portion of the power of the symbols of the two channels or a portion of the power ratio thereof.

The TPPR operator 222 determines a TPPR according to Equation (4) in case of Equation (1), and according to Equation (5) in case of Equation (3). The power ratio between the traffic channel and the pilot channel is determined, and then the calculation result is provided to the MIMO demodulator 230.

When the symbol of the pilot channel used for channel estimation is commonly used by MSs, precoding, which differs for each MS, is not applied to the symbol of the pilot channel. Thus, as illustrated in FIG. 2, precoding is applied to a channel estimation value by a receiving end of each MS.

The MIMO demodulator 230 generates a Log Likelihood Ratio (LLR) value by receiving a value output from the effective channel generator 220 (i.e., the channel estimation value to which precoding is applied), the symbol of the traffic channel, and the power ratio between the symbols of the traffic channel and the pilot channel.

According to an embodiment of the present invention, the LLR value may be generated in such a manner that the power ratio between the pilot channel and the traffic channel, i.e., the output of the TPPR operator 222, is delivered to the effective channel generator 220, and a value used for an effective channel and the symbol of the traffic channel are delivered to the MIMO demodulator 230.

Rate dematching units 240 and 245 perform rate dematching on the generated LLR value, and FEC decoders 250 and 255 perform channel decoding on the LLR value. CRC units 260 and 265 detect an error from a decoded information bit and determine whether retransmission is necessary. If no error is detected, the LLR value is delivered to an S/P converter 270.

The transmitter controls the power of the pilot channel and the power of the traffic channel in an independent manner. The power of the pilot channel is regulated to minimum power that guarantees channel estimation performance even for an MS farthest from the transmitter.

For signaling of the power ratio between the physical channel and the pilot channel, a value obtained by quantizing the power ratio may be selected to be signaled. The quantization process may have an effect in an implementation process, which is described below.

In an embodiment of the present invention, the power of the control channel is determined by the power of the traffic channel as expressed by Equation (1) below.

$$P_{k,Control} = P_{k,Traffic} + P_{offset} - P_{k,refinement} \quad (1)$$

In Equation (1), k denotes a $k^{th}$ user. $P_{k,Control}$ denotes power of the control channel, and $P_{k,Traffic}$ denotes power of the traffic channel. $P_{offset}$ denotes offset power used to guarantee quality of the control signal, and has a positive value in general but may also have a negative value.

In addition, $P_{offset}$ is common to all MSs and may be a fixed value. Further, the value $P_{offset}$ may be common to all cells or may be different from one cell to another.

$P_{offset}$ may be implicitly predetermined by the transmitting end and the receiving end according to other conditions such as an MCS, power of a pilot signal, etc.

Further, $P_{offset}$ is set to be less than a transmission period of the control signal, and may be set to a different value for each MS or may be set to a value commonly updated for all MSs.

$P_{k,refinement}$ denotes refinement power, which is a power correction value for the remaining refinement duration used when a power interval is increased to estimate power of a control channel signal in a more accurate manner. $P_{k,refinement}$ is signaled in the transmitting end and is then transmitted to the receiving end. Alternatively, $P_{k,refinement}$ may be a determined value. The refinement power may be signaled and delivered from the transmitting end to the receiving end. The signaling may be periodically performed or may be performed when necessary. In addition, the refinement power may be a determined value, i.e., a fixed value. If the refinement power is not used, $P_{k,refinement}$ is set to 0.

The receiver may measure power of the control channel and the pilot channel. Therefore, since other values are known, the receiver may obtain power of the traffic channel using Equation (1) above. The refinement power is signaled, and an offset voltage is known to both the transmitter and the receiver. Thus, the power ratio between the traffic channel and the pilot channel may be obtained.

A new power control process considering quantization is described below. The pilot channel is first subjected to power control, and is used for quantization for power control of the traffic channel. A resultant value is expressed by Equation (2) below.

$$P_{Q,k,Traffic} = Q\left(\frac{P_{k,Traffic}}{P_{Pilot}}\right)P_{Pilot} \quad (2)$$

In Equation (2), k denotes a $k^{th}$ user. $P_{k,Traffic}$ denotes power of the traffic channel. $P_{Pilot}$ denotes power of the pilot channel. Q( ) denotes a quantization function.

Then, a quantization value for the power of the control channel may be obtained using Equation (3) below.

$$P_{k,Control} = Q\left(\frac{P_{k,Traffic}}{P_{Pilot}}\right)P_{Pilot} + P_{offset} - P_{Pilot}P_{Q,k,refinement} \quad (3)$$

In Equation (3), k denotes a $k^{th}$ user. $P_{k,Control}$ denotes power of the control channel, and $P_{k,Traffic}$ denotes power of the traffic channel. $P_{offset}$ denotes offset power used to guarantee quality of the control signal, and has a positive value in general but may also have a negative value. $P_{Q,k,refinement}$ is refinement power, which is a power correction value for the remaining refinement duration used when a power interval is increased to estimate power of a control channel signal in a more accurate manner. $P_{Q,k,refinement}$ is signaled in the transmitting end and is then transmitted to the receiving end. Alternatively, $P_{Q,k,refinement}$ may be a determined value. The refinement power may be signaled and delivered from the transmitting end to the receiving end. The signaling may be periodically performed or may be performed when necessary. In addition, the refinement power may be a determined value, i.e., a fixed value. If the refinement power is not used, $P_{Q,k,refinement}$ is set to 0.

$P_{Pilot}$ denotes power of the pilot channel. The offset power is identical to the offset power of Equation (1) above. The refinement power is not to extend power estimation accuracy (i.e., a quantization step) of the control channel but to directly extend estimation accuracy of the power ratio between the control channel and the pilot signal (i.e., a quantization step of a power ratio). Q( ) denotes a quantization function.

The receiver may measure power of the control channel and the pilot channel. Therefore, since other values are known, the receiver may obtain power of the traffic channel using Equation (3) above.

The refinement power is signaled, and an offset voltage is known to both the transmitter and the receiver. Thus, the power ratio between the traffic channel and the pilot channel may be obtained.

The refinement power may be used even if quantization is considered. A role of the refinement power is described in detail below according to an embodiment of the present invention.

It is assumed that the power ratio between the traffic channel and the pilot channel has 20 types of quantization steps, i.e., 0.05, 0.1, 0.15, . . . , 1. If 2 bits are assigned for signaling of the refinement power, there may be 5 types of quantization steps for the power ratio between the control channel and the pilot channel, i.e., 0.05, 0.25, 0.45, 0.65, and 0.85 (herein, offset power is assumed to be 0).

The quantization step for the power ratio between the control channel and the pilot channel is extended, and thus the receiving end may significantly reduce an estimation error rate.

If even the refinement power is not present, that is, if external signaling is not present, estimating using the control channel is effective. This is because, when using the traffic channel, a high-order modulation scheme is used to increase spectral efficiency, and thus an estimation error of the power ratio between the traffic channel and the pilot channel is great. Further, when using a Spatial Multiplexing (SM) MIMO scheme, the estimation error of the power ratio is further increased.

However, since the control channel is characterized in having a lower error rate than the traffic channel, a low-order modulation scheme and a spatial diversity scheme, rather than a spatial multiplexing scheme are used, thereby decreasing the estimation error.

The receiver may measure power of the control channel. Since other values are known, the power of the traffic channel may be obtained using Equation (2) above. The refinement power is signaled, and an offset voltage is known to both the transmitter and the receiver. Thus, the power ratio between the traffic channel and the pilot channel may be obtained.

The transmitting end may allow the power of the control channel to have a specific relation with the power of the traffic channel so that the receiving end may easily estimate the power ratio between the traffic channel and the pilot channel.

The TPPR operator 222 of FIG. 2 may obtain a TPPR according to Equation (4) below in case of Equation (1), and according to Equation (5) below in case of Equation (3).

$$\frac{P_{k,Traffic}}{P_{Pilot}} = \frac{P_{k,Control} - P_{offset} + P_{k,refinement}}{P_{Pilot}} \quad (4)$$

$$= \frac{P_{k,Control}}{P_{Pilot}} + \frac{P_{k,refinement} - P_{offset}}{P_{Pilot}}$$

In Equation (4), k denotes a $k^{th}$ user. $P_{k,Control}$ denotes power of the control channel, and $P_{k,Traffic}$ denotes power of the traffic channel. $P_{offset}$ denotes offset power used to guarantee quality of the control signal, and has a positive value in general but may also have a negative value. $P_{k,refinement}$ denotes refinement power, which is a power correction value for the remaining refinement duration used when a power interval is increased to estimate power of a control channel signal in a more accurate manner. $P_{k,refinement}$ is signaled in the transmitting end and is then transmitted to the receiving end. Alternatively, $P_{k,refinement}$ may be a determined value. The refinement power may be signaled and delivered from the transmitting end to the receiving end. The signaling may be periodically performed or may be performed when necessary. In addition, the refinement power may be a determined value, i.e., a fixed value. If the refinement power is not used, $P_{k,refinement}$ is set to 0. $P_{Pilot}$ denotes power of the pilot channel.

The receiver may measure power of the control channel and the pilot channel. Therefore, since other values are known, the receiver may obtain power of the traffic channel using Equation (4) above. The refinement power is signaled, and an offset voltage is known to both the transmitter and the receiver. Thus, the power ratio between the traffic channel and the pilot channel may be obtained.

$$Q\left(\frac{P_{k,Traffic}}{P_{Pilot}}\right) = \frac{P_{k,Control} - P_{offset}}{P_{Pilot}} + P_{Q,k,refinement} \quad (5)$$

In Equation (5), k denotes a $k^{th}$ user. $P_{k,Control}$ denotes power of the control channel, and $P_{k,Traffic}$ denotes power of the traffic channel. $P_{offset}$ denotes offset power used to guarantee quality of the control signal, and has a positive value in general but may also have a negative value. $P_{Q,k,refinement}$ denotes refinement power, which is a power correction value for the remaining refinement duration used when a power interval is increased to estimate power of a control channel signal in a more accurate manner. $P_{Q,k,refinement}$ is signaled in the transmitting end and is then transmitted to the receiving end. Alternatively, $P_{Q,k,refinement}$ may be a determined value. That is, the refinement power may be signaled and delivered from the transmitting end to the receiving end. The signaling may be periodically performed or may be performed when necessary. In addition, the refinement power may be a determined value, i.e., a fixed value. If the refinement power is not used, $P_{Q,k,refinement}$ is set to 0.

$P_{Pilot}$ denotes power of the pilot channel. The refinement power is not to extend power estimation accuracy (i.e., a quantization step) of the control channel but to directly extend estimation accuracy of the power ratio between the control channel and the pilot signal (i.e., a quantization step of a power ratio). Q( ) denotes a quantization function.

The receiver may measure power of the control channel and the pilot channel. Therefore, since other values are known, the receiver may obtain power of the traffic channel using Equation (5) above. The refinement power is signaled, and an offset voltage is known to both the transmitter and the receiver. Thus, the power ratio between the traffic channel and the pilot channel may be obtained.

Figure 3:
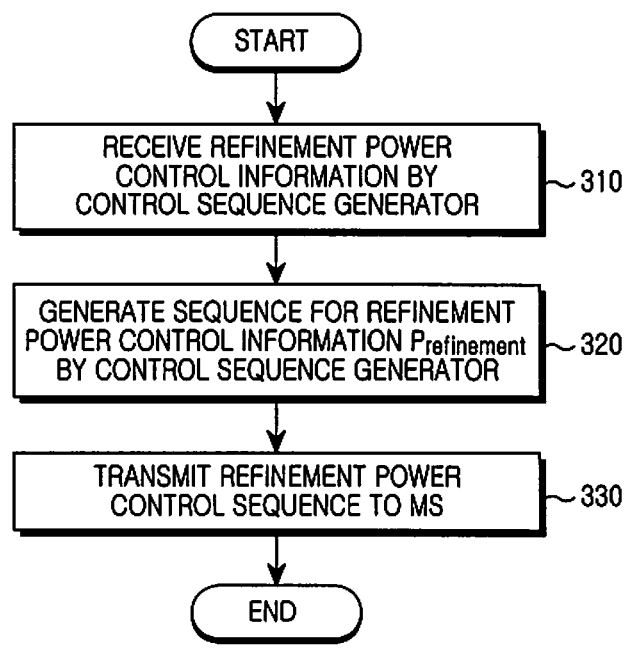
FIG. 3 is a flowchart illustrating an operation of a transmitter, according to an embodiment of the present invention.

FIG. 3 is a flowchart illustrating an operation of a transmitter, according to an embodiment of the present invention.

Referring to FIG. 3, a control sequence generator of the transmitter receives refinement power control information in step 310. The refinement power control information is generated by a control power controller and is provided to the control sequence generator.

Next, the control sequence generator generates a control sequence for the refinement power control information in step 320.

Next, the control sequence generator transmits, to an MS, the generated sequence for the refinement power control information in step 330.

The refinement power may be signaled and delivered from the transmitting end to the receiving end. The signaling may be periodically performed or may be performed when necessary. In addition, the refinement power may be a determined value, i.e., a fixed value. If the refinement power is not used, the refinement power is set to 0.

Thereafter, the procedure of FIG. 3 ends.

Figure 4:
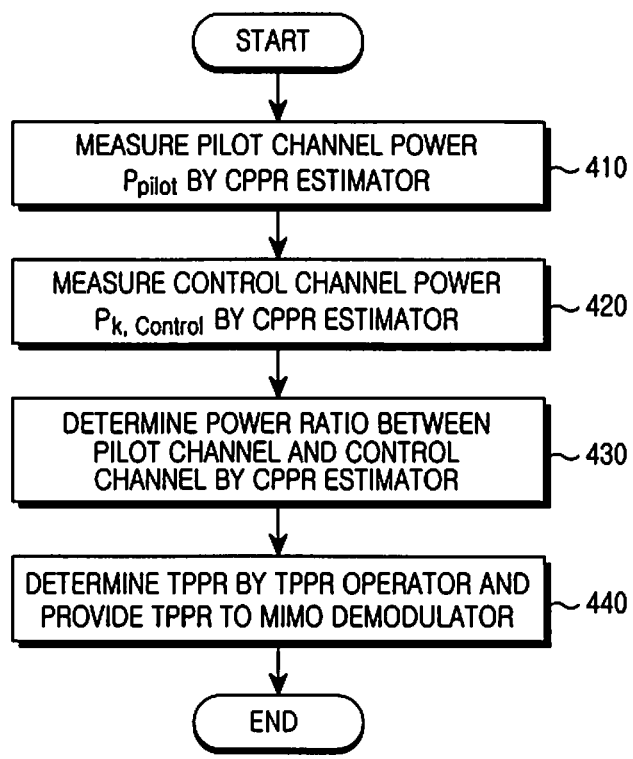
FIG. 4 is a flowchart illustrating an operation of a receiver, according to an embodiment of the present invention.

FIG. 4 is a flowchart illustrating an operation of a receiver, according to an embodiment of the present invention.

Referring to FIG. 4, a CPPR estimator of the receiver measures power of a pilot channel in step 410, and measures power of a control channel in step 420.

Next, the CPPR estimator determines a power ratio between the pilot channel and the control channel in step 430. The CPPR estimator provides a TPPR operator with the measured power of the pilot channel and the control channel and the power ratio between the pilot channel and the control channel.

Next, the TPPR operator determines a TPPR on the basis of the power of the pilot channel, the power of the control channel, an offset voltage (assumed to be determined), refinement power (provided by signaling), and the power ratio between the pilot channel and the control channel. The TPPR operator provides the determined TPPR to a MIMO demodulator in step 440.

The power of the control channel and the pilot channel may be measured. The receiver may obtain the TPPR using Equation (4) above. When quantization is considered, the receiver may obtain the TPPR using Equation (5) above.

Thereafter, the procedure of FIG. 4 ends.

According to embodiments of the present invention, a communication system using a high-order modulation scheme and an SM MIMO scheme may provide collective power control to a control channel using a low-order modulation scheme and a physical channel using spatial diversity. Therefore, an overhead generated by signaling of a power ratio may be reduced, and power estimation accuracy of a receiving end may be improved.

While the present invention has been shown and described with reference to certain preferred embodiments thereof, it will be understood by those skilled in the art that various changes in form and detail may be made therein without departing from the spirit and scope of the present invention as defined by the appended claims and their equivalents.

What is claimed is:

1. A receiving method of a receiver in a mobile communication system, the method comprising the steps of:
   estimating a Receive (Rx) signal received through a plurality of antennas;
   determining a power ratio between a traffic channel of the Rx signal and a pilot channel of the Rx signal; and
   determining a Log Likelihood Ratio (LLR) value using the power ratio between the traffic channel of the Rx signal and the pilot channel of the Rx signal, a symbol of the traffic channel of the Rx signal, and an Rx signal estimation value to which precoding is applied.

2. The method of claim 1, wherein determining the power ratio between the traffic channel of the Rx signal and the pilot channel of the Rx signal comprises:
   determining a refinement power;
   determining a power ratio between a control channel of the Rx signal and the pilot channel of the Rx signal; and
   determining the power ratio between the traffic channel of the Rx signal and the pilot channel of the Rx signal in accordance with the refinement power, a power of the control channel of the Rx signal, and the power ratio between the control channel of the Rx signal and the pilot channel of the Rx signal.

3. The method of claim 2, wherein the refinement power is obtained periodically or aperiodically from the Rx signal, or may be a fixed value without having to be obtained from the Rx signal.

4. The method of claim 1, wherein determining the power ratio between the traffic channel of the Rx signal and the pilot channel of the Rx signal comprises:
   determining a power ratio between a control channel of the Rx signal and the pilot channel of the Rx signal; and
   determining the power ratio between the traffic channel of the Rx signal and the pilot channel of the Rx signal in accordance with a power of the control channel of the Rx signal, and the power ratio between the control channel of the Rx signal and the pilot channel of the Rx signal.

5. The method of claim 1, wherein, in determining the power ratio between the traffic channel of the Rx signal and the pilot channel of the Rx signal, a power of the traffic channel of the Rx signal is obtained by $$P_{k,Control} = P_{k,Traffic} + P_{offset} - P_{k,refinement},$$

where k denotes a $k^{th}$ user, $P_{k,Control}$ denotes a power of a control channel, $P_{k,Traffic}$ denotes the power of the traffic channel, $P_{offset}$ denotes an offset power, and $P_{k,refinement}$ denotes a refinement power and is set to 0 when unused, whereas the power ratio between the traffic channel and the pilot channel is obtained by $$\frac{P_{k,Traffic}}{P_{Pilot}} = \frac{P_{k,Control} - P_{offset} + P_{k,refinement}}{P_{Pilot}}$$

$$= \frac{P_{k,Control}}{P_{Pilot}} + \frac{P_{k,refinement} - P_{offset}}{P_{Pilot}},$$

where k denotes the $k^{th}$ user, $P_{k,Control}$ denotes the power of the control channel, $P_{k,Traffic}$ denotes the power of the traffic channel, $P_{offset}$ denotes the offset power, $P_{k,refinement}$ denotes the refinement power and is set to 0 when unused, and $P_{Pilot}$ denotes a power of the pilot channel.

6. The method of claim 1, wherein, in determining the power ratio between the traffic channel of the Rx signal and the pilot channel of the Rx signal, a power of the traffic channel of the Rx signal is obtained by $$P_{k,Control} = Q\left(\frac{P_{k,Traffic}}{P_{Pilot}}\right)P_{Pilot} + P_{offset} - P_{Pilot}P_{Q,k,refinement},$$

where k denotes a $k^{th}$ user, $P_{k,Control}$ denotes a power of a control channel, $P_{k,Traffic}$ denotes the power of the traffic channel, $P_{offset}$ denotes an offset power, $P_{Q,k,refinement}$ denotes a refinement power considering quantization and is set to 0 when unused, $P_{Pilot}$ denotes a power of the pilot channel, and Q( ) denotes a quantization function, whereas the power ratio between the traffic channel and the pilot channel is obtained by $$Q\left(\frac{P_{k,Traffic}}{P_{Pilot}}\right) = \frac{P_{k,Control} - P_{offset}}{P_{Pilot}} + P_{Q,k,refinement},$$

where k denotes the $k^{th}$ user, $P_{k,Control}$ denotes the power of the control channel, $P_{k,Traffic}$ denotes the power of the traffic channel, $P_{offset}$ denotes the offset power, $P_{Q,k,refinement}$ denotes the refinement power considering quantization and is set to 0 when unused, $P_{Pilot}$ denotes the power of the pilot channel, and Q( ) denotes the quantization function.

7. A receiver apparatus in a mobile communication system, the apparatus comprising:
a channel estimator for estimating a Receive (Rx) signal received through a plurality of antennas;
a Traffic-to-Pilot Power Ratio (TPPR) operator for determining a power ratio between a traffic channel of the Rx signal and a pilot channel of the Rx signal; and
a Multiple Input Multiple Output (MIMO) demodulator for determining a Log Likelihood Ratio (LLR) value using the power ratio between the traffic channel of the Rx signal and the pilot channel of the Rx signal, a symbol of the traffic channel of the Rx signal, and an Rx signal estimation value to which precoding is applied.

8. The apparatus of claim 7, wherein the TPPR operator determines the power ratio between the traffic channel of the Rx signal and the pilot channel of the Rx signal in accordance with a refinement power provided from a Control-to-Pilot Power Ratio (CPPR) estimator, and a power ratio between a control channel of the Rx signal and the pilot channel of the Rx signal.

9. The apparatus of claim 8, wherein the refinement power is obtained periodically or aperiodically from the Rx signal, or may be a fixed value without having to be obtained from the Rx signal.

10. The apparatus of claim 8, wherein the TPPR operator receives the power ratio between the control channel of the Rx signal and the pilot channel of the Rx signal from the CPPR estimator and determines the power ratio between the traffic channel of the Rx signal and the pilot channel of the Rx signal in accordance with the obtained values.

11. The apparatus of claim 7, wherein the TPPR operator determines a power of the traffic channel of the Rx signal by $$P_{k,Control} = P_{k,Traffic} + P_{offset} - P_{k,refinement},$$

where k denotes a $k^{th}$ user, $P_{k,Control}$ denotes a power of a control channel, $P_{k,Traffic}$ denotes the power of the traffic channel, $P_{offset}$ denotes an offset power, and $P_{k,refinement}$ denotes a refinement power and is set to 0 when unused, whereas the TPPR operator determines the power ratio between the traffic channel and the pilot channel by $$\frac{P_{k,Traffic}}{P_{Pilot}} = \frac{P_{k,Control} - P_{offset} + P_{k,refinement}}{P_{Pilot}}$$

$$= \frac{P_{k,Control}}{P_{Pilot}} + \frac{P_{k,refinement} - P_{offset}}{P_{Pilot}},$$

where k denotes the $k^{th}$ user, $P_{k,Control}$ denotes the power of the control channel, $P_{k,Traffic}$ denotes the power of the traffic channel, $P_{offset}$ denotes the offset power, $P_{k,refinement}$ denotes the refinement power and is set to 0 when unused, and $P_{Pilot}$ denotes a power of the pilot channel.

12. The apparatus of claim 7, wherein the TPPR operator determines a power of the traffic channel of the Rx signal by $$P_{k,Control} = Q\left(\frac{P_{k,Traffic}}{P_{Pilot}}\right)P_{Pilot} + P_{offset} - P_{Pilot}P_{Q,k,refinement},$$

where k denotes a $k^{th}$ user, $P_{k,Control}$ denotes a power of a control channel, $P_{k,Traffic}$ denotes the power of the traffic channel, $P_{offset}$ denotes an offset power, $P_{Q,k,refinement}$ denotes a refinement power considering quantization and is set to 0 when unused, $P_{Pilot}$ denotes a power of the pilot channel, and Q( ) denotes a quantization function, whereas the TPPR operator determine the power ratio between the traffic channel and the pilot channel by $$Q\left(\frac{P_{k,Traffic}}{P_{Pilot}}\right) = \frac{P_{k,Control} - P_{offset}}{P_{Pilot}} + P_{Q,k,refinement},$$

where k denotes the $k^{th}$ user, $P_{k,Control}$ denotes the power of the control channel, $P_{k,Traffic}$ denotes the power of the traffic channel, $P_{offset}$ denotes the offset power, $P_{Q,k,refinement}$ denotes the refinement power considering quantization and is set to 0 when unused, $P_{Pilot}$ denotes the power of the pilot channel, and Q( ) denotes the quantization function.

* * * * *